United States Patent [19]
Foote et al.

[11] Patent Number: 5,184,265
[45] Date of Patent: * Feb. 2, 1993

[54] MAGNETIC HEAD SUSPENSION ASSEMBLY IN A DISK DRIVE

[75] Inventors: Wayne E. Foote, Eagle; Paul K. Mui, Boise; Roger R. Sleger, Meridian., all of Id.

[73] Assignee: Hewlett-Packard Company, Palo Alto, Calif.

[*] Notice: The portion of the term of this patent subsequent to Feb. 19, 2008 has been disclaimed.

[21] Appl. No.: 713,621

[22] Filed: Jun. 10, 1991

Related U.S. Application Data

[63] Continuation of Ser. No. 434,749, Nov. 13, 1989, abandoned.

[51] Int. Cl.⁵ .......................... G11B 5/55; G11B 5/48; G11B 33/14
[52] U.S. Cl. .................................. 360/106; 360/104; 360/97.02
[58] Field of Search ............ 360/106, 105, 104, 97.02, 360/109, 97.01, 92.03

[56] References Cited

U.S. PATENT DOCUMENTS

| | | | |
|---|---|---|---|
| 4,428,012 | 1/1984 | Applequist et al. | 360/106 |
| 4,691,258 | 9/1987 | Kobayashi et al. | 360/105 |
| 4,722,014 | 1/1988 | Takekado | 360/106 |
| 4,787,001 | 11/1988 | Okutsu | 360/106 |
| 4,796,122 | 1/1989 | Levy et al. | 360/98.01 |
| 4,831,479 | 5/1989 | Noguchi et al. | 360/105 |
| 4,831,480 | 5/1989 | Takeda | 360/106 |
| 4,855,853 | 8/1989 | Matsushita et al. | 360/106 |
| 4,860,135 | 8/1989 | Cain | 360/106 |
| 4,881,142 | 11/1989 | Kato et al. | 360/106 |
| 4,994,931 | 2/1991 | Foote | 360/106 |
| 5,040,086 | 8/1991 | Hikino | 360/97.02 |

Primary Examiner—John H. Wolff
Assistant Examiner—Craig A. Renner
Attorney, Agent, or Firm—E. F. Oberheim

[57] ABSTRACT

In a magnetic disk memory drive, inertia in the magnetic head positioning system is reduced by providing a light weight, integrated, magnetic head suspension assembly fabricated of weldable thin sheet material and shaped to provide the required magnetic head flexibility, mobility and spring loading, while affording structural rigidity and dimensional stability in the disk memory drive environment. Unwanted magnetic head displacements are additionally minimizing by employing materials in the magnetic head suspension assembly, including the actuator, the arm and the load beam or flexure, having the same, or nearly the same, thermal expansion coefficients.

10 Claims, 3 Drawing Sheets

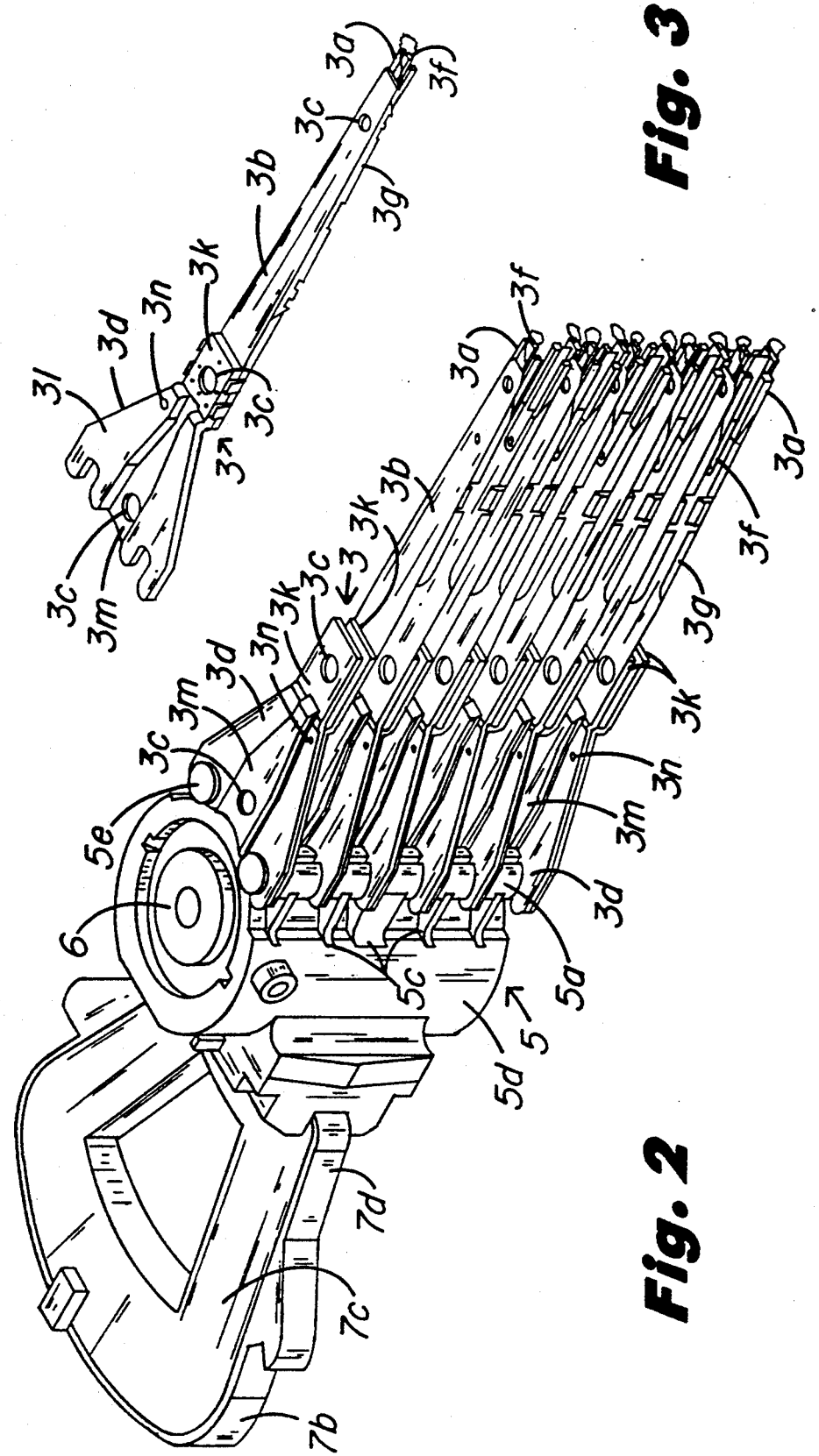

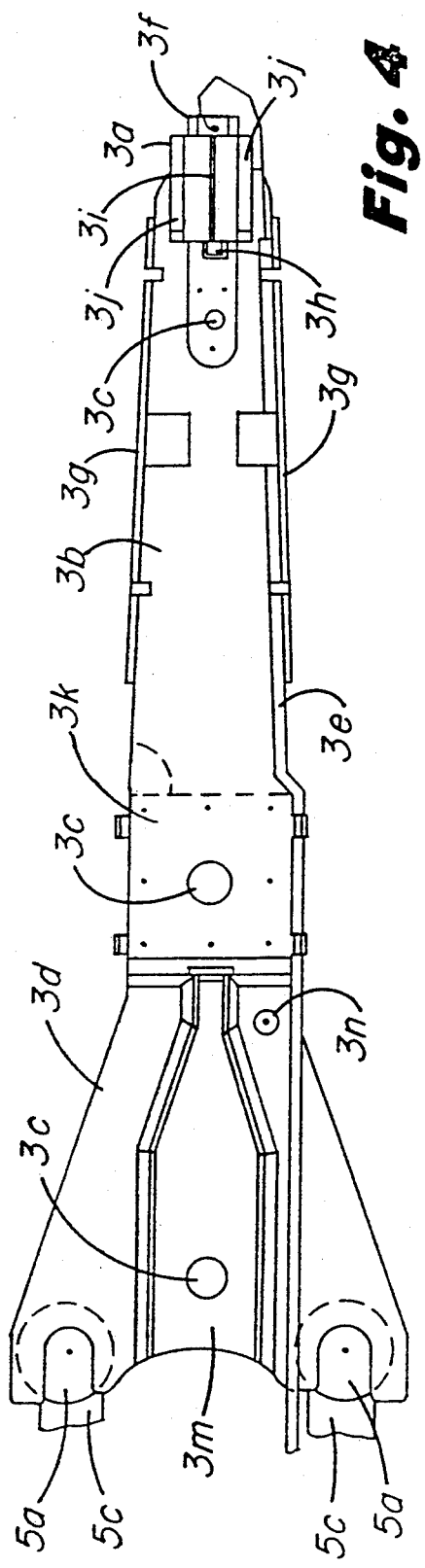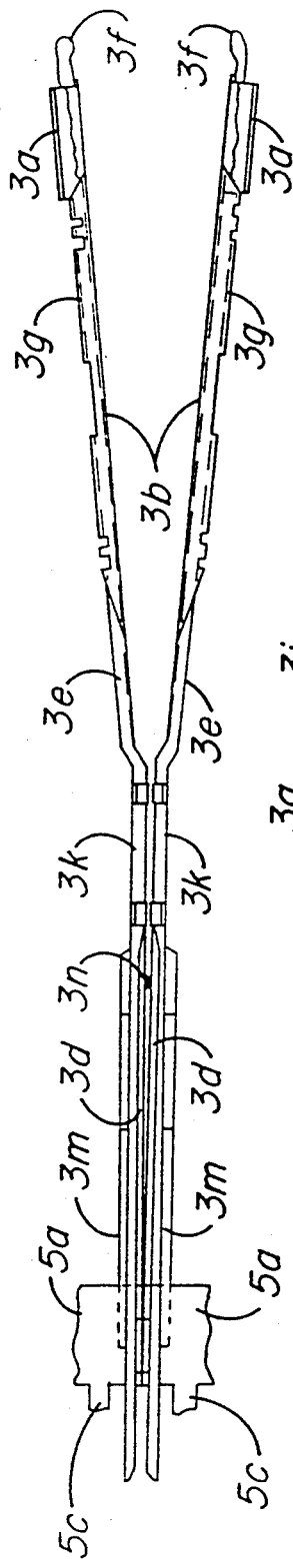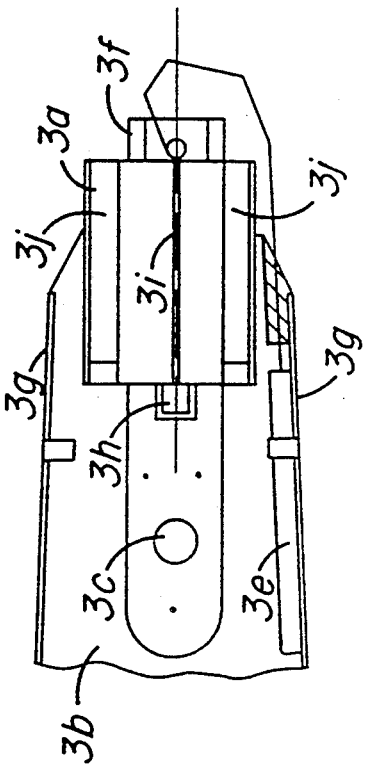

MAGNETIC HEAD SUSPENSION ASSEMBLY IN A DISK DRIVE

CROSS REFERENCE TO RELATED APPLICATIONS

This is a continuation of copending application Ser. No. 07/434,749 filed on Nov. 13, 1989, now abandoned.

TECHNICAL FIELD

This invention relates generally to magnetic head suspension assemblies in a disk memory drive and more particularly to a magnetic head suspension assembly in rotary or linear disk memory drives in which the moment of inertia is minimal consistent with structural requirements.

BACKGROUND ART

Disk memory drives generally comprise rotating magnetic memory disks, transducer heads and a linear or pivotally mounted magnetically driven actuator assembly which supports and positions the magnetic transducer heads at the disk surfaces and provides bidirectional movement of the magnetic heads over the disk or disks. Such disk memories are very high precision units requiring close dimensional tolerances in manufacturing. They are complex and delicate mechanically. In application, information stored on the disk must be accessed at high speed. This requires track seeking at high speed and with precision. To minimize power requirements in the servo system which drives the magnetic head suspension assemblies, it is important that the magnetic head suspension assembly be light in weight and yet of sufficient structural rigidity and stability to minimize unwanted magnetic head displacements when track seeking or track following, for example, which would interfere with the rapid positioning and utilization of a magnetic head at a designated track.

Prior art magnetic head suspension assemblies, as seen in the U.S. Pat. Nos. 3,931,641, 4,620,251, 4,754,353 and 4,796,122, typically comprise a rigid arm of aluminum or other lightweight material which is usually a casting of single piece or integrated construction. These castings are provided with projecting fingers or pads on to which the ends of the load beams which carry the magnetic heads are secured. The load beams are flexible and permit spring loaded movement of the magnetic heads in directions toward and away from the head parking disk surface against which the magnetic head is positioned at rest and provide a predetermined preloading of the magnetic head slider rails against a disk surface, so that at disk rotational speed the head takes off and literally flies on the thin film of air clinging to and traveling with the surface of the disk. The heads are usually positioned in a parked position adjacent the center of the disks where there is no recorded information. Thus sliding contact of the sliders on the magnetic heads as the disk comes up to speed in preparation for track seeking, and reading or writing of tracks on the disk, or as the disk decelerates and stops when the disk memory is shut down, will not cause any damage to any of the information which is recorded on the disk surface through damage to the surface of the disk by scraping. These load beams are fabricated of a very lightweight spring metal such as stainless steel which is very thin and has flanged lateral edges to limit flexibility to a location adjacent to the point of load beam attachment to the pad at the end of the suspension arm and to provide stiffness along the length of the load beam. The magnetic head is attached to the free end of the load beam by means of a thin lightweight metal spring material, called a flexure providing flexibility of the magnetic head in roll and pitch, and stiffness in yaw.

As will be seen by reference to these patents, the arm which supports the load beam and which is either mounted for linear or angular movement, is a rigid arm of aluminum as described in U.S. Pat. No. 3,931,641. When viewed with respect to the load beam it is a large, bulky heavy structure constituting the bulk of the magnetic head support and is the primary contributor to a high moment of inertia of the magnetic head suspension assembly.

DISCLOSURE OF THE INVENTION

This invention provides improvements over prior art such as discussed above in the provision of a magnetic head suspension assembly which eliminates the bulky heavy arm structures such as typically provided in prior art arrangements. The magnetic head suspension assembly of this invention comprises a load beam which carries the magnetic head. This load beam is attached to one end of an arm which is stamped from thin lightweight metal in a three dimensional configuration having lateral and vertical rigidity along its length as well as at its one end which is attached to the load beam. The remaining end of this arm is longitudinally slotted in laterally displaced positions adjacent opposite lateral edges and is attached directly to pads on a pivotally mounted actuator bearing housing, in the disclosed embodiment.

By this expedient, the massive arm structure of the prior art devices is eliminated which significantly reduces the moment of inertia in the disclosed embodiment about the actuator axis. Thus the mass which must be moved either linearly or angularly is significantly reduced which reduces the force required, either angularly in a rotary disk drive, or linearly in a linear disk drive, to achieve high rates of movement of the magnetic head in track seeking operations. In the rotary drive depicted, the supporting structure which receives the inner ends of the arms of the magnetic head suspension assembly are located at the surface of the actuator bearing housing. Thus all massive structure in this arrangement has a very short radial moment arm and corresponding small rotational inertia.

The actuator bearing housing, the arm and the load beam are made of materials having the same or substantially the same thermal expansion coefficients to at least minimize, if not eliminate all together, unwanted magnetic head displacement due to dimensional changes resulting from temperature variations. Preferably the magnetic head suspension assembly comprises parts of the same materials, which, in a preferred embodiment is stainless steel to permit welding of the flexure to the arm.

The actuator bearing housing is described in detail in a copending application of Wayne E. Foote, Ser. No. 07/434,662, now U.S. Pat. No. 4,994,931 filed on the same day as this application, entitled "An Actuator Structure For A Magnetic Head Suspension Assembly In A Disk Drive and assigned to the assignee of this invention. Subject matter of this referenced application is incorporated herein in its entirety by reference thereto.

BRIEF DESCRIPTION OF THE DRAWINGS

FIG. 2 is a perspective view of the rotary actuator assembly of FIG. 1, at an enlarged scale, showing the improved rotary actuator type of magnetic head suspension assembly of this invention.

FIG. 3 is a perspective view of the improved magnetic head suspension assembly for a downwardly facing magnetic head.

FIGS. 4 and 5 are, respectively, plan and edge views of the improved magnetic head suspension assembly, showing two assemblies in back-to-back relationship as they are positioned when mounted on the rotary actuator bearing housing.

FIG. 6 is a plan view, drawn to a further enlarged scale, of the mounting of a magnetic head in a laterally off-center position on the gimbal spring, providing flexibility in roll and pitch for the magnetic head.

BEST MODE FOR CARRYING OUT THE INVENTION

Figure 1:
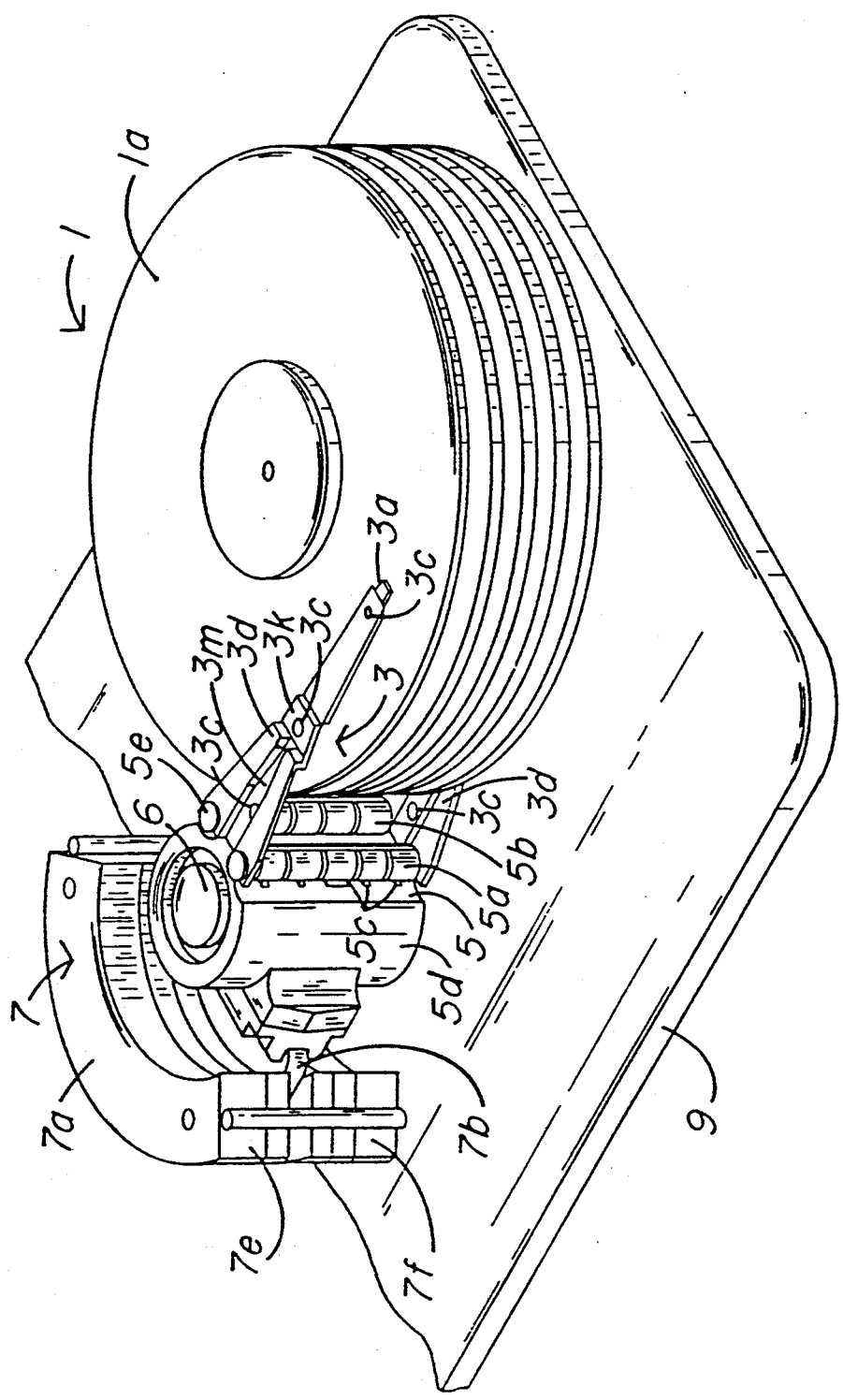
FIG. 1 is a perspective view of a portion of a rotary disk memory drive embodying the principles of this invention.

FIGS. 1-6 illustrate the details of a presently preferred embodiment of this invention. Referring now to FIG. 1, there is illustrated a disk memory drive comprising a magnetic disk assembly 1 adapted to be driven by a motor (not shown). Such a magnetic disk assembly will be rotated at a constant speed about an axis 1b. The unique major functional assembly of this invention in a disk drive comprises a magnetic head suspension assembly 3, a rotary actuator bearing housing 5 and a magnetic drive subassembly 7. The rotary actuator bearing housing 5 is journaled on a spindle 6 which is attached to a base plate 9. Other structural features of this disk drive, believed not to be essential to an understanding of this invention, are not illustrated in the interest of simplicity.

The actuator bearing housing 5 is provided with two columns 5a and 5b of mounting pads which mount the individual magnetic head suspensions 3. These two columns are slotted laterally in the same plane, in plane positions intermediate the planes of the memory disks 1a in the disk stack 1. The confronting faces of these mounting pads, that is the width of the individual slots, is sufficient to receive two magnetic head suspension assemblies 3 in back-to-back relationship, as seen in FIG. 2 and in FIG. 5. The fit is a sliding fit providing some friction interference. When fitted in the slots, the magnetic head suspension assemblies 3 position the magnetic heads between the disks. As seen in FIG. 5, the flexures, or load beams 3b, which carry the magnetic heads 3a at their extremities, are deflected in opposite directions. The degree of angular deflection for the spring material employed and the geometry of the flexure 3b, is such that, when the heads are positioned between the disks and engage the confronting faces of the disks in the head parking area, the spring loading of each head is such that the head will take off and fly on the thin film of air traveling with the disk surface and moving at disk speed.

The individual pads of the columns 5a and 5b are attached to the actuator bearing housing 5d and cantilevered therefrom by means of webs 5c, which except for the center most of these webs, are deflectable. Bolts 5e extending through axially aligned holes in the pads in the respective columns of pads 5a and 5b apply pressure longitudinally of the columns of pads when the nuts at the bottom side are tightened. The longitudinal bolt force displaces the pads longitudinally of the columns 5a and 5b, except for the center-most pad, deflecting the cantilever webs 5c which attach the pads to the actuator bearing housing 5d. By this means, the inner ends of the magnetic head suspension assemblies are securely clamped to the actuator bearing housing.

Prior to tightening of the bolts 5e, alignment rods, not shown in these illustrations, are inserted through the corresponding holes 3c which are in the flexures 3b and the arms 3d. This precisely aligns the magnetic head suspension assemblies minimizing, if not completely eliminating, relative lateral displacement of the magnetic heads, providing precise magnetic head alignment when the bolts 5e are tightened and the assembly completed at which time the alignment rods are removed.

An alternative to providing flexibility in the mounting of the pads in the columns 5a and 5b is to provide individual webs 5c which are substantially rigid so that the individual pads are rigidly positioned, or to otherwise rigidly integrate the columns 5a and 5b or their equivalent on the bearing housing and as before to cut the slots undersize so that the width of a slot is less than the double thickness of the arm 3d. With a pair of arms 3d in back-to-back relationship the ends of the arms are press fitted into the undersized slot. The end of the arms being forced into the slots are slightly deformed, it being an interference fit. The gripping force is sufficient and intentionally is sufficiently high as to insure that even under the most severe acceleration forces (e.g. hitting of the crash stops) there is no relative motion between the bearing housing 5 and the arms 3d. This also provides a sturdy and dimensionally stable assembly that is easily reworkable.

Magnetic drive subassembly 7 comprises a stator 7a and rotor 7b. The rotor is attached to the actuator bearing housing 5d in a position diametrically opposite to the attachment of the columns of mounting pads 5a and 5b. As seen in FIG. 2, the rotor 7b comprises a bobbin 7c in which a coil (not shown) is wound. The peripheral enclosure 7d seals the coil within the bobbin 7c. The rotor 7b sweeps in an arc about the axis of rotation 6 of the actuator bearing housing 5d, in a position between the confronting faces of permanent magnets 7e and 7f of the stator 7a. Energization of the coil of the rotor with direct current of one polarity or the reverse then rotates the actuator bearing housing 5d about its axis and swings the magnetic head in an arc about the actuator bearing housing axis 6 in a direction substantially radially of the disk.

Power is supplied to the magnetic heads 3a by means of conductors 3e, which are secured by clips along the side edges of the flexure 3b and which extend along the displaced back faces of the arms 3d. As seen in FIG. 4, which is a plan view of the magnetic head suspension assembly 3 which carries the upwardly facing magnetic head, the conductors are brought out along the backface of the arms 3d, on opposite sides of the arms, so that when the arms are positioned in back-to-back relationship, as seen in FIG. 5, with one magnetic head 3a pointing up and the other magnetic head 3a pointing down, the wires at the rear of the magnetic head suspension assembly 3 will lie on the same side of the magnetic head suspension assembly stack, where they may be joined with a conventional flexible circuit (not shown), connecting the individual magnetic heads to the servo track seeking and track following circuits and to the reading and writing circuits (not shown) of the disk memory drive.

As best seen in FIG. 6, the magnetic head 3a is supported on the end of the load beam 3b by means of a thin, flat gimbal spring 3f which is spot welded at three points, by means of laser welding, for example, to the surface of the load beam 3b at its end, in a position between the flanges 3g along the sides of the load beam 3b. This spring is provided with a narrow resilient tongue 3h, attached at one end to the spring surface and displaced along its length from the spring surface. The magnetic head 3a is attached to the tongue 3h in a laterally offset position, as seen by the lateral displacement of the center pole piece 3i of the magnetic head with respect to a longitudinal center line of the magnetic head suspension assembly 3. The purpose of this lateral offset is to compensate the difference in aerodynamic lifting force at the sliders 3j, which are located at the side edges of the magnetic head 3a, due to the difference at the different radii in the tangential velocity of the air at the disk surface on which the magnetic head is flying. Thus the inner rail of the slider 3j on the upper side of the magnetic head 3a, as seen in FIG. 6, has a larger moment arm with respect to the center of the spring 3h to which it is attached than does the outer rail of the slider 3j at the bottom of the magnetic head 3a. This displacement is calculated to balance the aerodynamic lifting forces at the sliders to prevent tilting of the magnetic head in roll in operation, eliminating the probability of some degree of electrical malfunction associated with this tilt.

As best seen in FIG. 3, the arm 3d, which is part of a magnetic head suspension assembly 3 for a downwardly facing magnetic head, is provided with a pad 3k which, as viewed, is displaced downwardly from the surface of the remaining portion of the arm. The load beam 3b is attached to the bottom face of the pad 3k and is preferably secured thereto by means of laser spot welding. Dimensional stability in the remaining portion of the arm 3d together with structural rigidity is achieved by displacing the central portion 3m of the mounting face 31. A dimple, 3n, is displaced upwardly from the face 31 of the arm 3d. The magnetic head suspension assemblies for the upward facing and downward facing magnetic heads are as shown in FIG. 3 and are identical, except for the routing of the conductor along the opposite sides of the load beam 3d. By these expedients when the magnetic head suspension assemblies with the oppositely routed wires are disposed in engaged back-to-back relationship, the wires lie on the same side of the magnetic head suspension assembly stack. The dimples 3n in this position are laterally disposed and, as seen in FIG. 5, function to provide adequate displacement at the mounting pads 3k.

The magnetic head suspension assembly described herein is sufficiently strong to withstand shock and vibration in the environment in which it is employed. Ideally, the load beam 3b, the arm 3d and the actuator bearing housing, comprising the magnetic head suspension assembly, are made of identical materials, preferably stainless steel, or of materials of the same or nearly the same thermal expansion coefficients, which can be joined by welding. In practice, the material of the arm 3d will usually be thicker than that of the flexure 3b and because of its cross sectional configuration will be sufficiently stable and rigid to obviate unwanted displacements of the pad 3k.

This magnetic head suspension assembly eliminates the need for a mounting plate such as seen in FIG. 1 of U.S. Pat. No. 4,754,353 which is required when the flexure is secured by screws to an arm of dissimilar material. By using an arm of the same material as the flexure, such as stainless steel, or of a material to which the flexure may be welded, the weight of the mounting plate and of the attaching screws is eliminated. In this structure, the mass and the weight of prior art arms, as seen in the referenced patents, is eliminated. The use of the stamped arm 3d, such as illustrated herein, reduces the moment of inertia of the magnetic head suspension assembly. The use of the same materials in the actuator bearing housing 5, the arm 3d and the load beam 3b, eliminates thermal expansion mismatches which can cause positional misalignment of the heads of up to 100 microinches, which is unacceptable.

The magnetic head suspension system of this invention improves track seeking performance by minimizing the moment of inertia of the assembly 3. It reduces the potential for magnetic head-to-head misalignment by eliminating the thermal mismatch between the load beam 3b and the arm 3d. It reduces the parts count in the overall assembly which reduces cost and it simplifies the magnetic head suspension assembly, which simplifies reworking.

The principles of this invention are equally applicable to linear disk drive magnetic head suspension assemblies to reduce inertia and improve track seeking and track following performance and to reduce magnetic head misalignment errors due to mismatches in thermal expansion coefficients in the magnetic head suspension assembly.

INDUSTRIAL APPLICABILITY

This magnetic head suspension assembly is useful in disk memory drives in applications in any computing, data processing, communication, or display function requiring an accessible memory.

What is claimed is:

1. A low inertia magnetic head suspension assembly for a magnetic disk memory drive, having at least one magnetizable memory disk, comprising:
   an elongated load beam having first and second ends, said load beam being of resilient stainless steel sheet metal having a predetermined thickness;
   a magnetic head resiliently mounted on said first end of said load beam;
   an arm of stainless steel sheet metal of a predetermined thickness, having first and second ends and having a thermal expansion coefficient substantially the same as that of said load beam and of a cross-sectional configuration to provide structural rigidity;
   said second end of said load beam being welded directly to said first end of said arm;
   actuator means having a thermal coefficient of expansion substantially the same as that of said load beam;
   said second end of said arm being attached directly to said actuator means with said magnetic head on the first end of said load beam positioned adjacent one surface of said memory disk.

2. The magnetic head suspension assembly of claim 1, in which:
   the thickness of the stainless steel sheet metal of said arm being greater than the thickness of the stainless steel sheet metal of said load beam.

3. The magnetic head suspension assembly of claim 2, in which
said cross-sectional configuration of said arm comprises an integral displaced central portion of sheet metal.

4. The magnetic head suspension assembly of claim 3, in which:
said actuator means comprises a rotary actuator.

5. The magnetic head suspension assembly of claim 4, in which:
said rotary actuator comprises an actuator bearing housing of the same metal as said arm and said load beam.

6. The magnetic head suspension assembly of claim 1, in which:
said actuator means comprises a rotary actuator.

7. The magnetic head suspension assembly of claim 6, in which:
said rotary actuator comprises an actuator bearing housing of the same metal as said arm and said load beam.

8. The magnetic head suspension assembly of claim 1, in which:
said load beam and said arm are of the same material.

9. A low inertia magnetic head suspension assembly for a magnetic disk memory drive, having at least one magnetizable memory disk, comprising:

an elongated load beam having first and second ends, said load beam being of resilient stainless steel sheet metal having a predetermined thickness;

a magnetic head resiliently mounted on said first end of said load beam;

an arm of stainless steel sheet metal of a predetermined thickness, having first and second ends and having a thermal expansion coefficient substantially the same as that of said load beam and of a cross-sectional configuration to provide structural rigidity;

said cross-sectional configuration of said arm comprises an integral displaced central portion of the arm between side edges;

said second end of said load beam being welded directly to said first end of said arm;

actuator means;

at least a pair of spaced supports on said actuator means defining a slot therebetween of lesser width than the thickness of the sheet metal of said arm;

said second end of said arm being a press fit into said slot.

10. The magnetic head suspension assembly of claim 9, in which:
the press fit of said arm in said slot slightly deforms said arm and is sufficient to retain said arm in said slot in all functional modes of the disk memory drive.

* * * * *